US009049845B2

(12) United States Patent
Albuquerque

(10) Patent No.: US 9,049,845 B2
(45) Date of Patent: Jun. 9, 2015

(54) SYSTEM APPARATUS AND METHOD OF TRAINING DOGS TO DETECT COMPLEX HAZARDOUS SUBSTANCES

(71) Applicant: Lisa Lee Albuquerque, Dumfries, VA (US)

(72) Inventor: Lisa Lee Albuquerque, Dumfries, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 30 days.

(21) Appl. No.: 14/169,455

(22) Filed: Jan. 31, 2014

(65) Prior Publication Data

US 2014/0311420 A1     Oct. 23, 2014

Related U.S. Application Data

(60) Provisional application No. 61/814,385, filed on Apr. 22, 2013.

(51) Int. Cl.
    *A01K 15/02*         (2006.01)

(52) U.S. Cl.
    CPC ........................ *A01K 15/02* (2013.01)

(58) Field of Classification Search
    CPC .................... A01K 15/02; F24F 7/04
    USPC ........................... 119/712; 206/3
    See application file for complete search history.

(56) References Cited

U.S. PATENT DOCUMENTS

2001/0047771 A1 * 12/2001 Bulanda et al. ............... 119/712
2006/0174843 A1 * 8/2006 Poyner .......................... 119/712

OTHER PUBLICATIONS

Kopp, Carlo; Defeating Improvised Explosive Devices; Defence Today; (Sep. 14, 2009); pp. 12-14; vol. 7., No. 6.
Kopp, Carlo; Technology of Improvised Explosive Devices; Defence Today; (2007-2008); pp. 46-48; vol. 6., No. 3.
Wilson, Clay; Improvised Explosive Devices (IEDs) in Iraq: Effects and Countermeasures; Navy History and Heritage Command; (Feb. 10, 2006); pp. 1-4 [Internet: http://www.history.navy.mil/library/online/ied.htm]; accessed Dec. 26, 2013; The Navy Department Library.

(Continued)

*Primary Examiner* — Tien Dinh
*Assistant Examiner* — Aaron Rodziwicz
(74) *Attorney, Agent, or Firm* — US Naval Research Laboratory; John L. Young; Sally A. Ferrett

(57) ABSTRACT

A training apparatus composed of pvc pipe used to train scent dogs to detect complex hazardous substances from an odor mixture having at least two separated component odors housed in at least two ventilated containers. At least two elbow shaped pipes having compartments, in which the containers reside. The apparatus further includes end caps securing the containers in the compartments. A two way clean out adapter pipe, having three openings, is connected to the elbow pipes, where separate odors, from separate explosive components situated in the separated containers, mix by diffusion and provide an odor mixture developed from the separated components. A drain assembly, having a drain cover, with holes is affixed on top of the drain assembly; allowing odor mixtures to rise up and out of the drain assembly, where the scent detecting dogs are trained to identify the explosive components.

20 Claims, 4 Drawing Sheets

(56) References Cited

OTHER PUBLICATIONS

Lazarowski, Lucia, et al.; Explosives detection by military working dogs: Olfactory generalization from components to mixtures; Applied Animal Behaviour Science; (2013); pp. 1-10; [Internet: http://dx.doi.org/10.1016/j. applanim.2013.11.010] accessed Dec. 26, 2013 online; Elsevier.

Adams, G. J. et al.; Sleep, Work, and the effects of shift work in drug detector dogs *Canis familiars*; Applied Animal Behaviour Science; (1994); pp. 115-126; vol. 41; Elsevier.

Faust, A. A. et al.; Observations of Military Exploitation of Explosives Detection Technologies; (Proceedings of SPIE: Detection and Sensing of Mines, Explosive Objects, and Obscured Targets XVI (Apr. 25-29, 2011); Session 8; vol. 8017 16); pp. 1-12; [Internet: http://proceedings.spiedigitallibrary.org] accessed Dec. 26, 2013 online; SPIE.

Furton, Kenneth G. et al.; The scientific foundation and efficacy of the use of canines as chemical detectors for explosives; Talanta (2001); pp. 487-500; vol. 54; Elsevier.

Lit, Lisa et al.; Handler beliefs affect scent detection dog outcomes; Animal Cognition (2011); pp. 387-394; vol. 14; Springer.

Ostmark, Henric et al.; Vapor Pressurs of Explosives: A Critical Review; Propellants Explosives Pyrotechnics; (2012); pp. 12-23; vol. 37; Wiley-VCH Verlag, Weinheim, Germany.

Gazit, Irit et al.; Explosives detection by sniffer dogs following strenuous physical activity; Applied Animal Behaviour Science (2003); pp. 149-161; vol. 81; Elsevier.

Harper, Ross et al.; Identification of dominant odor chemicals emanating form explosives for use in developing optimal training aid combinations and mimics for canine detection; Talanta (2005); pp. 313-327; vol. 67; Elsevier.

Herstik, Mike; The False Alert: Reasons and Remedies; Working Canines; The Detonator; pp. 43-45; vol. 37, No. 5; [Internet: http://www.detectiondogs.com/authorship.html] accessed: Dec. 26, 2013 Online.

Johnston, J.M.; Canine Detection Capabilities: Operational Implications of Recent R & D Findings; (Jun. 1999); pp. 1-7; Institute for Biological Detection Systems, Auburn University.

* cited by examiner

APPARATUS FOR TRAINING DOGS TO DETECT COMPLEX HAZARDOUS
SUBSTANCES 100

(TOP VIEW)

APPARATUS FOR TRAINING DOGS TO DETECT COMPLEX HAZARDOUS SUBSTANCES 200

(SIDE VIEW)

SYSTEM APPARATUS AND METHOD OF TRAINING DOGS TO DETECT COMPLEX HAZARDOUS SUBSTANCES

RELATED APPLICATIONS

The instant U.S. patent application claims the benefit of domestic priority from and is related to U.S. Provisional Patent Application No. 61/814,385; DEVICE FOR TRAINING DOGS TO DETECT COMPLEX HAZARDOUS SUBSTANCES; filed on Apr. 22, 2013; whose inventor is Lisa Lee Albuquerque; and where said U.S. Provisional Patent Application is herein incorporated by reference in its entirety.

"Other material . . . incorporated by reference . . . non-patent publications" (MPEP 608.01 Specification 608.01(p) Completeness: (Lazarowski, Lucia et al., (Edited by Lisa Lee Albuquerque (Inventor)), Explosives detection by military working dogs: Olfactory generalization from components to mixtures, Applied Animal Behaviour Science (2013) pp. 1-10 [Internet: http://dx.doi.org/10.1016/j.applanim.2013.11.010] accessed Dec. 26, 2013, Elsevier) herein incorporated by reference in its entirety.

FIELD OF THE INVENTION

The present invention relates to detection of Improvised Explosive Devices, regarding defense of cities, military installations, forces and assets and civilian personnel against attacks, involving Home-Made Explosives. More particularly, the present invention enables training of scent detecting working dogs to detect individual components of home-made explosives such as ammonium nitrate (AN), potassium chlorate KClO3 (also known as PC) and similar chemicals in close proximity to an array of fuels such as sugar, powdered aluminum or petroleum jelly without requiring the components to be mixed into an unstable, explosive, compound, as the combined components would be normally encountered in an operational environment.

BACKGROUND OF THE INVENTION

Scent detecting dogs are routinely trained to detect certain substances, such as drugs or explosives, by using samples of the actual substance(s) of interest. However, the capability of training scent dogs to detect an explosive compound, where the explosive compound is made up of two or more elements combined (each element having separate and distinct odors) which are mixed to produce the compound is not well settled. Attempts to train scent detecting dogs using psuedoscents, or inert substances or individual components of a normally mixed/combined compound have been ineffective and not authorized for use within the U.S. Department of Defense (currently, the Department of Defense trains with ammonium nitrate (AN) for AN based Home-Made Explosives (HMEs) and potassium chlorate for PC based HMEs, with only a little success; however the Department of Defense has not determined adequate ways to train with actual HMEs. (NOTE: Furthermore, psuedoscents are not authorized for use within the Department of Defense). In the case of Home-Made Explosives using either ammonium nitrate (AN), which is widely used as a fertilizer, or potassium chlorate (PC), the combination of possibilities of using, as a booster, different types of fuel oils or numerous types of powdered aluminum (AL) components with the widely-available bulk explosives, i.e., ammonium nitrate (AN) or potassium chlorate (PC), would be almost infinite, for example, sugar or wood pulp are among the readily available fuels that can be used (NOTE: throughout this disclosure, KClO3 and PC are used interchangeably to represent potassium chlorate). Furthermore, production, storage or use of such training aids made with the actual substances combined is not allowed under service Arms, Ammunition and Explosive Safety regulations. The classification status of Interim Hazard Classification (IHC) for AN+AL is in place; however, none of the PC based HMEs are stable enough to pass tests to make them eligible to qualify for the IHC status.

Operation Enduring Freedom (Afghanistan) and, to a lesser degree Operation Iraqi Freedom (Iraq) have demonstrated that coalition freedom of movement can be curtailed by an adaptive enemy using Improvised Explosive Devices having a main charge of either ammonium nitrate (AN) or potassium chlorate (PC). Scent detecting dogs have demonstrated great success at providing standoff detection of buried Improvised Explosive Devices which use military grade explosives, for which the dogs have been trained to detect. However, the vast majority of Improvised Explosive Devices in Afghanistan have had a main charge of ammonium nitrate (AN) or potassium chlorate (PC). There are anecdotal reports of widespread failures of scent detecting dogs attempting to detect Improvised Explosive Devices having ammonium nitrate (AN) or potassium chlorate (PC) based main charges, where those dogs had been trained to detect ammonium nitrate (AN) or potassium chlorate (PC). Battalion After Action Reports (AAR's) since 2009 have identified the problem of such failures, where scent detecting dogs failed to detect Improvised Explosive Devices having ammonium nitrate (AN) or potassium chlorate (PC) components. However, many AAR interviews and lessons learned reports also indicated that acquiring Home-Made Explosive samples from unexploded Improvised Explosive Devices (IEDs), then training scent detecting dogs to detect these unexploded IED samples in theater proved to be highly effective; but, this approach relies on access to the Home-Made Explosive device, and requires time and training expertise, which is not always readily available prior to the warfighter beginning operational use of scent detecting dogs on dismounted patrols. Furthermore, the explosive ordnance disposal (EOD) specialists are exposed to increased danger in the process of retrieving unexploded IED samples, as opposed to just blowing the device(s) in place (BIP), where retrieving the samples requires dismantling the device in order to obtain the main charge. This retrieval process is very dangerous when standard military grade munitions are involved; however, the retrieval process involving IEDs is extremely dangerous, because the IEDs are made from non-standard materials which could be characterized as unstable junk, such as previously unexploded military devices, combined with non-standard non-military grade improvised munitions.

Therefore, the need exists for a system, method and apparatus capable of assisting in the determination of whether an odor mixture developed from separated components could enhance the detection of PC based mixtures, in general; further, the need exists for a system, method and apparatus capable of training scent dogs to detect an explosive device, where the explosive device is made up of more than two combined elements (forming an explosive compound) having more than two combined odors, from a plurality of explosive compounds which are mixed to produce the explosive. Further, the need exists for a system, method and apparatus capable of testing the potential of scent detection working dogs to be trained effectively using psuedoscents, or inert substances or individual components of a normally mixed/combined compound of explosives, as well as military grade explosives. Further, the need exists for a system, method and apparatus capable of testing widely available bulk explosives, such as ammonium nitrate (AN) and potassium chlorate (PC), which can interact with an infinite number of possible boosters of different types of fuel oils, powdered aluminum compounds or common household products, such as sugar and wood pulp, where production, storage or use of such training aids made with the actual substances combined is neither practical nor allowed under service Arms, Ammunition and Explosive Safety regulations, either used before deployment, as well as in theater. Furthermore, the need exists for a compact, portable and low cost system, method and apparatus for training scent detecting dogs in theater in close proximity to operational environments for testing acquired explosive samples having a main charge of ammonium nitrate (AN) or potassium chlorate (PC).

SUMMARY OF THE INVENTION

A training apparatus, method, and system are used to train scent dogs to detect complex hazardous substances from an odor mixture developed from at least two separated explosive components having at least two separated odors respectively is herein disclosed. The apparatus includes a first container and an at least second container having a plurality of holes in a top side of the first and second containers, providing said holes for ventilation of the containers. A first elbow shaped pipe and a second elbow shaped pipe, having a first compartment and a second compartment, where the first and second containers reside in the first and second compartments, respectively. A first end cap and a second end cap positioned in the first and second compartments to seal the first and second containers securely in the compartments. A two way clean out adapter pipe, having a third opening, a fourth opening and a fifth opening configured as coupling connections is connected to the first elbow and second elbow pipes, where separated odors, from separated material components situated in the separated containers, mix by diffusion and provide an odor mixture developed from separated components presented to a scent detecting dog. A connector pipe is connected to the fifth opening on top of the two way clean out adapter pipe; and a drain assembly, having a drain cover, where the drain cover includes a plurality of holes and is affixed on top of the drain assembly; and where the drain assembly is connected on top of the connector pipe at a sixth opening formed at the bottom of the drain assembly, allowing odors to rise up and out of the training apparatus, where dogs are trained with at least two explosive elements; and where the least two explosive elements are not combined.

DETAILED DESCRIPTION

Figure 1A:
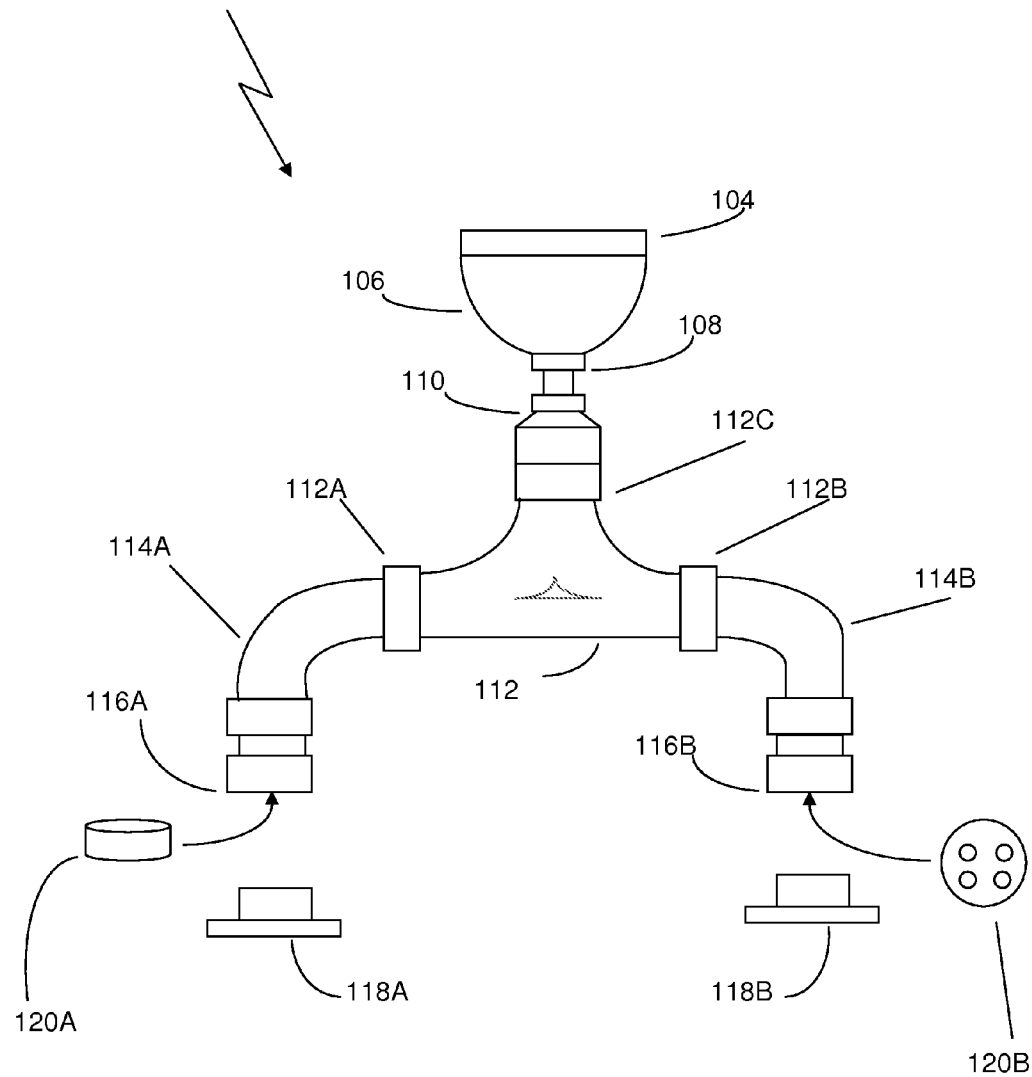
FIG. 1A illustrates a side view of a first embodiment of an apparatus for training dogs to detect complex hazardous substances 100, having vertical legs.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that the exemplary embodiments can also be employed in other applications. Further, the terms "a", "an", "first", "second" and "third" etc. used herein do not denote limitations of quantity, but rather denote the presence of one or more of the referenced items(s).

Apparatus

Figure 1B:
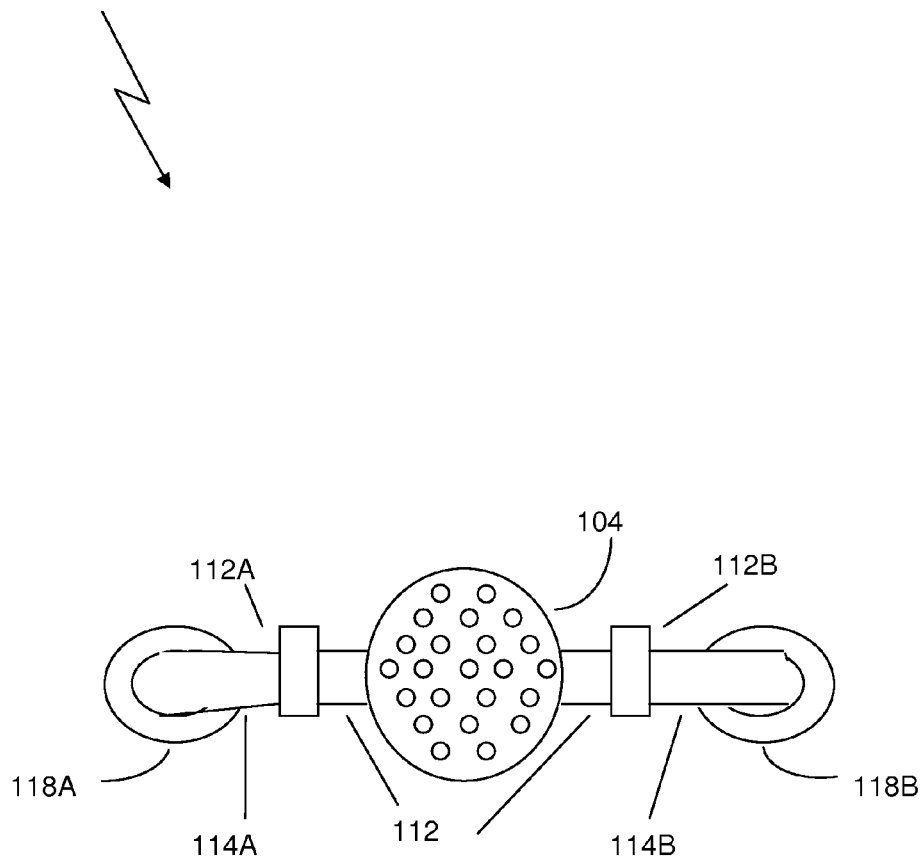
FIG. 1B illustrates a top view of the first embodiment of the apparatus for training dogs to detect complex hazardous substances 100, having vertical legs.

Referring to FIG. 1A and FIG. 1B, in the first exemplary embodiment, an apparatus for training dogs to detect complex hazardous substances 100, as illustrated in FIG. 1A and FIG. 1B, is constructed using 3 inch diameter polyvinyl chloride (PVC) plastic pipe and fittings. Any size diameter commercially off the shelf PVC pipe and fittings available can be used, as well as special, custom made PVC pipe and fittings, as long as such materials maintain the separate integrity of the component substances under test, while allowing free exchange of vapor; i.e., end caps 118A and 118B must be tightly sealed to prevent odor vapor plumes from escaping from first PVC elbow pipe 114A and second PVC elbow pipe 114B compartment openings 116A and 116B, respectively. In order to maintain the integrity of the component substances under test, the PVC pipe fittings are tightly sealed at the end caps 118A and 118B to preclude vapor plumes from originating at the legs (i.e., escaping into the air from the legs) of the device. Furthermore, any other hard surface conduits (including tubing) such as other duct-work and pipe and fitting materials (including metal, rubber, other plastics, ceramics and/or glass materials) of any diameter can also be used; however, PVC is selected in preferential exemplary embodiments of the instant invention, because it is inexpensive, readily available, accommodates tight seals, as well as facilitates ease of disassembly, assembly and ease of cleaning to avoid cross-contamination of samples; thus, exemplary embodiments provide capabilities of testing dogs in a low cost way that reduces testing variables, does not require manufacture of explosive components for testing/does not require special storage capabilities for the explosive components to be used in various tests/does not require special transportation capabilities of explosive components. Utilization of exemplary embodiments increases test efficiency and increases the reliability, repeatability and predictability of findings. Utilization of exemplary embodiments reduces handler created variables, and confines odors to a very small area in air in close proximity to the drain assembly caused by the process of diffusion causing the odors and odor mixtures to spread from a high concentration of odors in the first container and the second separate container to a low concentration of odors throughout the training apparatus, while requiring the dog(s) to actively search and focus in order to make the odor discrimination; furthermore, utilization of exemplary embodiments increases the number of dogs that could be tested on a single configuration because the odor is confined to the training device and does not contaminate the training area. In addition, the device can be used as a research tool in university settings (normally, most universities cannot work with actual explosives).

In research settings, exemplary embodiments of the training devices are used to determine if one complex odor smells like another complex odor, such that it can be determined whether odor "A" combined with used fuel oil smells like odor "A" combined with un-used fuel oil or whether odor "A" combined with fuel oil from a different region without EPA oversight smells like odor "A" combined with fuel oil from the United States (NOTE: the sulfur content of Pakistani fuel oil is extremely high and therefore, training scent dogs using U.S. low sulfur fuel oil is not adequate for testing in theater. Furthermore, exemplary embodiments used in research environments help investigators and scent dog trainers understand the cognitive process that dogs go through when the dogs are interpreting information received from their odor receptors and interpreting information about trained and untrained odors. Further, in research environments, exemplary embodiments are used to evaluate the ability of scent dogs to learn categories of odors where a novel instance of a trained category results in assignment of the novel instance to the trained category. In additional exemplary embodiments, the training apparatus is composed of pipe and tubing components selected from a group of pipe and tubing components consisting of polyvinyl chloride (PVC) plastic pipe and fittings, and metal pipe and fittings, rubber pipe and fittings, glass pipe and fittings and ceramic pipe and fittings having a range in diameter of from about 2 inches up to about 4 inches, even though any size diameter material which is suitable and practical for the intended purpose of the exemplary embodiments.

Referring to FIG. 1A and FIG. 1B, the apparatus for training dogs to detect complex hazardous substances 100 includes a first container 120A and at least a second container 120B, which individually and separately contain different samples of Home-Made Explosive individual component materials, respectively, which when mixed together in an operational environment comprise a Home-Made Explosive compound; where, the individual component materials include potassium chloride (KCL), or potassium chlorate (PC), or ammonium nitrate (AN) or powdered aluminum, or other compounds. For example, a typical mixture in an operational environment would include mixing components such as potassium chlorate (PC) and fuel oil.

Odor containers, such as the first container 120A and/or the second container 120B are cleaned using chlorine wipes, running water and terry cloth; and the odor containers 120A and 120B are never used for more than one odor component, the possibility still exists that some cross contamination may occur during handling of the first and second containers 120A and 120B.

Again referring to FIG. 1A and FIG. 1B, the sample compounds themselves are completely separated in the closed, individual containers, such as the first container 120A and the at least second container 120B; also, in other embodiments, there can be any number of additional separate containers configured in association with the training devices for training dogs to detect hazardous substances. Further referring to FIG. 1A and FIG. 1B, the odor containers, such as the first container 120A and the second container 120B have ventilation holes in them (see the second container 120B, which is a side view of the container 120A and/or 120B), where the holes allow vapor to escape and vent into the air, while using filter paper around the sample(s), and where the filter paper precludes loss of particulate matter of the component sample(s). In the various figures of the exemplary embodiments, holes exist, but are not visible in the illustrations of container(s) 120A.

Referring to FIG. 1A and FIG. 1B, illustrating the first exemplary embodiment, the apparatus for training dogs to detect complex hazardous substances 100 includes a first opening 116A and a second opening 116B forming openings in the first PVC elbow pipe 114A and the second PVC elbow pipe 114B configurations, and further includes a first PVC end cap 118A and a second PVC end cap 118B, both of which secure the first container 120A and the second container 120B respectively in place in the first opening 116A and the second opening 116B respectively; and where, the first and second PVC elbow pipes 114A and 114B, respectively are configured vertically, as legs, upon which the apparatus for training dogs to detect complex hazardous substances 100 stands on the first and second end caps 118A and 118B (see FIG. 1A and FIG. 1B).

Again referring to FIG. 1A and FIG. 1B, the apparatus for training dogs to detect complex hazardous substances 100 further comprises a PVC two way clean out adapter pipe 112, having a third opening 112A and a fourth opening 112B, and a fifth opening 112C, in an inverted "tee" (i.e., "T") shape, forming coupling connections on the sides and top of the PVC two way clean out adapter pipe 112; thereby interfacing at least with the first PVC elbow pipe 114A and the second PVC elbow pipe 114B respectively; where the PVC two way clean out adapter pipe 112 comprises an open cavity accessible through the third, fourth and fifth openings 112A, 112B, and 112C, respectively.

Referring, additionally, to FIG. 1A, the apparatus for training dogs to detect complex hazardous substances 100, further comprises a tapered and/or un-tapered PVC connector and/or reducer pipe 110 assembly the two pieces of pipe are connected and can be the same diameter or having a range of diameter sizes ranging from about 2 inches up to about 4 inches, interfaced with and attached to the fifth opening 112C on top of the PVC two way clean out adapter pipe 112.

Again referring to FIG. 1A and FIG. 1B, the apparatus for training dogs to detect complex hazardous substances 100 further comprises a PVC drain assembly 106, having a drain cover 104, where the drain cover 104 has a plurality of ventilation holes; and where the drain cover 104 is affixed on top of the PVC drain assembly 106; where, the apparatus for training dogs to detect complex hazardous substances 100 further comprises a sixth opening 108 on the bottom of the PVC drain assembly 106. And, the PVC drain assembly 106 is interfaced to the tapered and/or un-tapered PVC connector and/or reducer pipe 110 (these connector and/or reducer pipes 110 can have the same diameter or can have a range of diameters) assembly through the sixth opening 108; in addition, the un-tapered (straight) and/or the tapered PVC reducer and/or connector pipe 110 connects to the fifth opening 112C of the two way clean out adapter pipe 112.

Figure 2A:
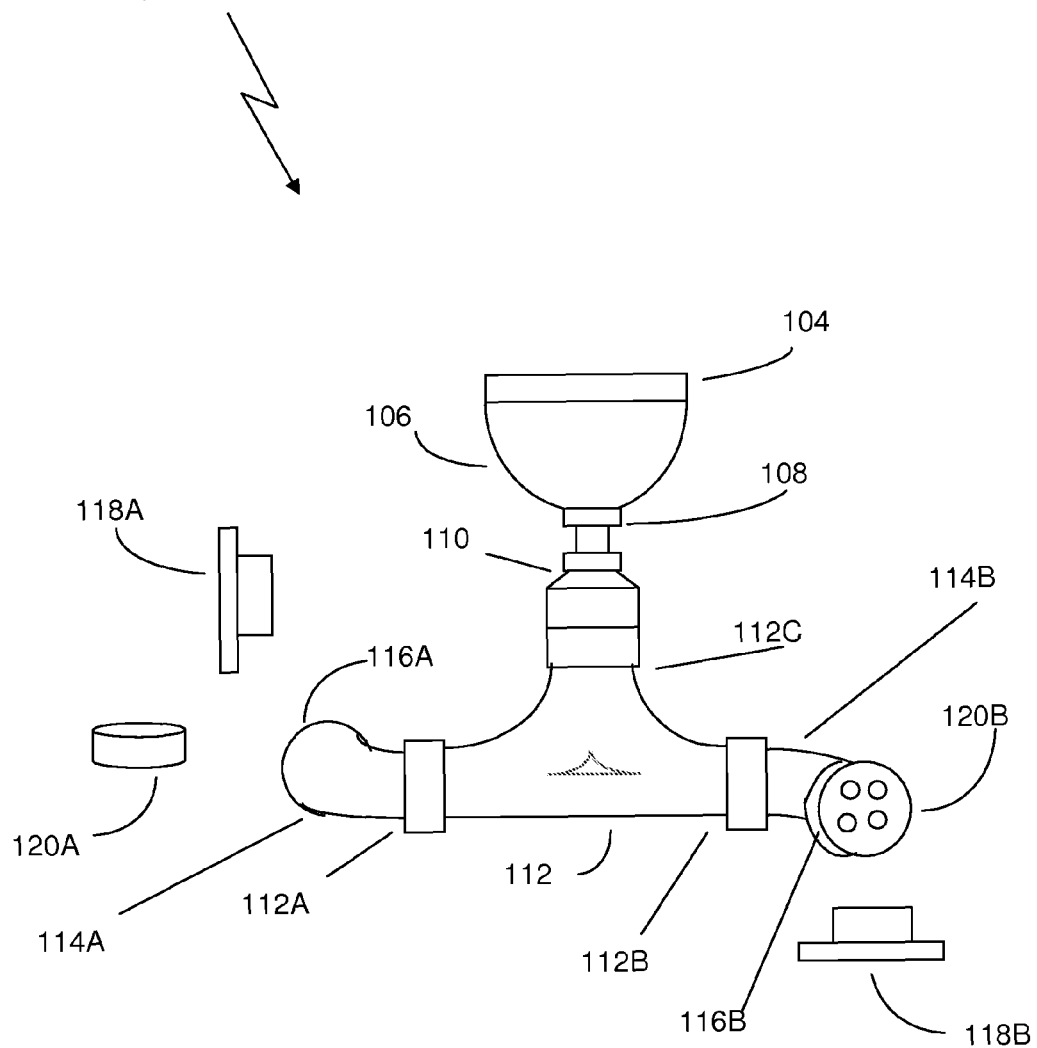
FIG. 2A illustrates a side view of a second embodiment of an apparatus for training dogs to detect complex hazardous substances 200, having horizontal legs.
Figure 2B:
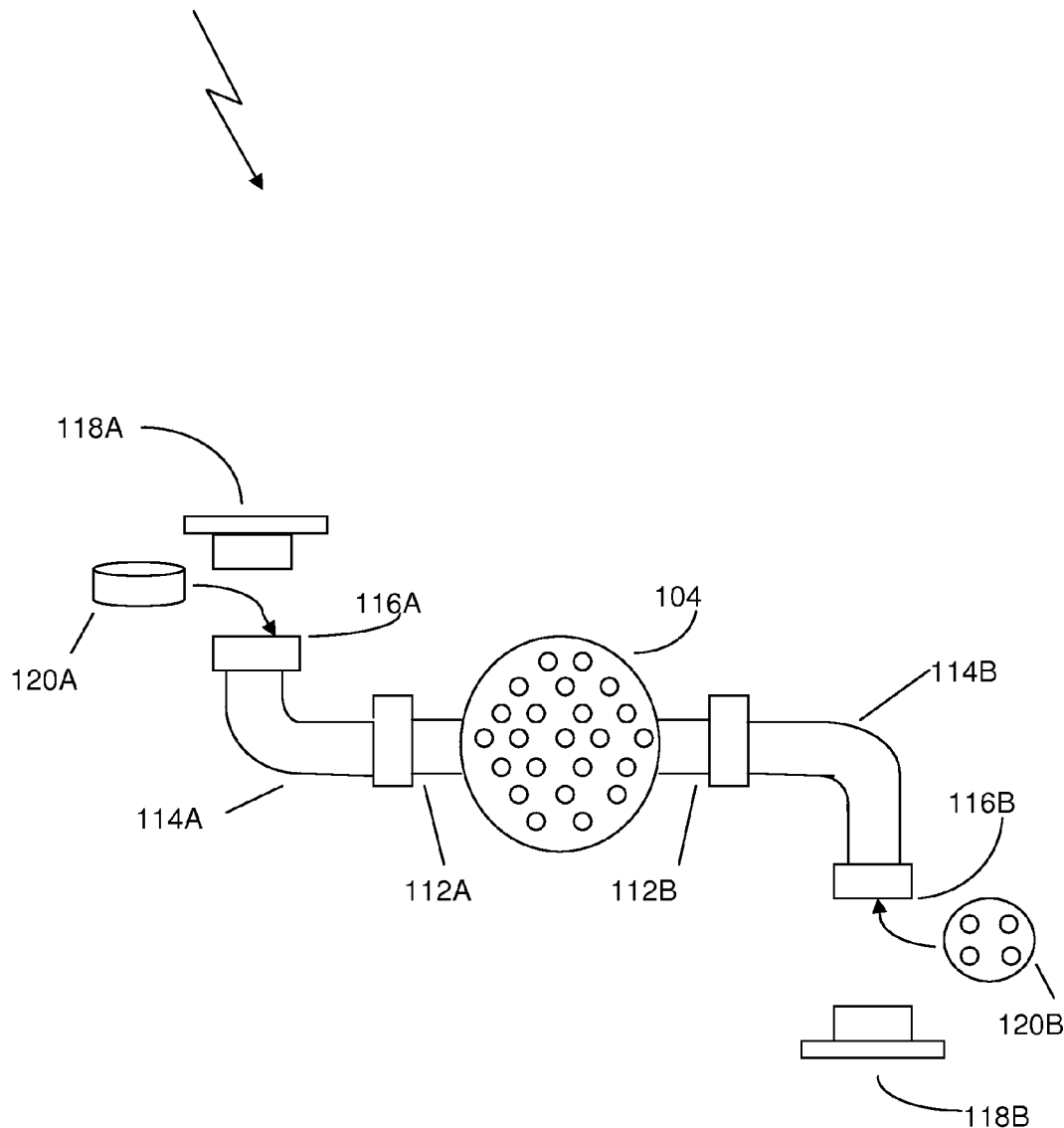
FIG. 2B illustrates a top view of the second embodiment of the apparatus for training dogs to detect complex hazardous substances 200, having horizontal legs.

In a second exemplary embodiment referring to FIG. 2A and FIG. 2B, a second apparatus for training dogs to detect complex hazardous substances 200 is configured in a manner similar to the apparatus described for training dogs to detect complex hazardous substances 100, such as illustrated in the first exemplary embodiment, except that the second exemplary embodiment comprises a first and second PVC elbow pipe 114A and 114B configured horizontally, upon which the second apparatus for training dogs to detect complex hazardous substances 200 rests; and where the end caps 118A and 118B are positioned to face in directions opposite of each other (see FIG. 2A and FIG. 2B).

A third exemplary embodiment and a fourth exemplary embodiment, are configured by removal of the PVC drain assembly 106 and the drain cover 104, leaving the un-tapered and/or tapered PVC connector and/or reducer pipe 110 assembly as the top profile of the device. In addition, explosive compound substances, making up the material components under test can be in static-proof bags or inside a filter paper bindle which is placed inside a circular container, such as the first container 120A and the second containing 120B.

Production

A first PVC elbow pipe 114A is inserted and secured into a third opening 112A of the PVC two way clean out adapter pipe 112, and rotated to configure the PVC elbow pipe 114A into a desired position from a vertical to a horizontal leg profile.

A second PVC elbow pipe 114B is inserted and secured into a fourth opening 112B of the PVC two way clean out adapter pipe 112, and rotated to configure the PVC elbow pipe 114A into a desired position from a vertical to a horizontal leg profile.

The large diameter end of the un-tapered and/or the tapered PVC connector and/or reducer pipe 110 assembly is inserted and secured into a fifth opening 112C of the PVC two way clean out adapter pipe 112.

The stem of a PVC drain assembly 106 is inserted and secured into the top of the un-tapered and/or tapered PVC connector and/or reducer pipe 110 assembly.

A drain cover 104 is installed onto the top of the PVC drain assembly 106, and secures the drain cover 104 onto the PVC drain assembly 106, by way of appropriate fasteners and/or sealants. NOTE: A sealant can only be used if the sealant is odorless, so as not to create training problems, such as introducing unwanted distracter odors; in addition, most sealants are not desirable because dismantling and cleaning of the devices would be more difficult.

A first explosive compound component from a plurality of possible explosive components (such as ammonium nitrate (AN) or potassium chlorate (PC)) is inserted into a first container 120A.

The first container 120A, having the explosive compound component, is positioned into a bottom hole 116A of the first PVC elbow pipe 114A.

A first end cap 118A is installed onto the bottom hole 116A of the first PVC elbow pipe 114A, covering and securing in place the first container 120A in the first PVC elbow pipe 114A.

A second explosive compound component from a plurality of possible explosive components (such as powdered aluminum) is positioned into a second container 120B.

The second container 120B, having the second explosive compound component, is installed into a bottom hole of the second PVC elbow pipe 114B.

A second end cap 118B is installed onto the bottom hole of the second PVC elbow pipe 114B, securing the second container 120B in the first PVC elbow pipe 114B in a manner similar to that described for the PVC elbow pipe 114A.

In the first embodiment, referring to FIG. 1A and FIG. 1B, the first and second PVC elbow pipe 114A and 114B are configured as vertical legs, upon which the apparatus for training dogs to detect complex hazardous substances 100 stands on the first and second end caps 118A and 118B respectively.

In the second exemplary embodiment, the apparatus for training dogs to detect complex hazardous substances 200 comprises a first and second PVC elbow pipe 114A and 114B configured horizontally, upon which the apparatus for training dogs to detect complex hazardous substances 200 rests; and where the end caps 118A and 118B are positioned to face opposite directions, (see FIG. 2A and FIG. 2B).

In each of the first and second exemplary embodiments, the apparatus for training dogs to detect complex hazardous substances 100, and the apparatus for training dogs to detect complex hazardous substances 200, respectively are secured to either a wall or a platform to prevent tipping over of the devices and mixing the samples; and where flex-ties, clamps, nuts and bolts or a manufactured base or other fasteners, sealants or couplers can be used to secure the devices.

Method of Operation/Training

A user/operator/human trainer inserts, into one or more of containers 120A and/or 120B, samples of explosive component materials comprising a Home-Made Explosive, which is manufactured by mixing explosive components, such as potassium chlorate (PC) and powdered aluminum. Instead of being mixed, the samples of explosive components are each separated in closed individual containers, such as container 120A and 120B. The containers 120A and 120B have holes in them to allow odor vapors to escape. In addition filter paper is wrapped around the explosive samples to preclude loss of particulate matter. Both component materials, in their separate containers 120A and 120B are placed simultaneously in the first and second openings 116A and 116B, respectively of the apparatus first and second elbow pipes 114A and 114B and the first and second end caps 118A and 118B, respectively and are secured to hold the containers 120A and 120B in place. Odor vapors rise through the PVC two way clean out assembly 112, where the odor vapors combine. The scent detecting dog samples the odor plume at the PVC drain assembly 106 and the dog is trained by the trainer to perform a conditioned response to the odor stimulus.

The training of dogs to detect explosives presents several challenges. First, the types of explosives found in IEDs reflect local availability and the consistency of the explosive components can vary widely from region to region. Explosives commonly found in IEDs include organics (e.g., 1,3,5-hexahydro-1,3,5-trinitrotriazine [RDX]; 2,4,6-trinitrotoluene [TNT]), inorganic oxidizers (e.g., ammonium nitrate [AN], potassium chlorate [PC]), or a combination (e.g., Amatol—a RDX and AN mixture) (Kopp, 2008). Further, the use of homemade explosives (HMEs) has recently become more common than commercial and military explosives (Ostmark et al., 2012). Consequently, the amount and ratios of substances used to make HMEs can vary widely by individual variation in measurement. A second challenge is that the base explosive can be further modified by adding additional gelling agents (e.g., wax or petroleum jelly), fuels (e.g., diesel fuel or kerosene), or distracting odors (Kopp, 2008). Thus, most target (explosive) odors encountered by dogs under field conditions are comprised of a combination of many different substances (Harper et al., 2005), which may differ from those used in training. Learning to respond upon detection of a trained odor, then, may not generalize to detection of novel odor combinations. A third challenge reflects the need to develop training aids that can be handled safely and yet provide the representative odor profile of the explosive(s) of interest.

In the instant disclosure, several challenges are addressed. One challenge was to determine whether dogs trained to detect one explosive component odor will reliably recognize a mixture containing that odor, where reliability is quantifiable; such that the Department of Defense requires legal minimum reliability standards of 95% for explosives detection dogs and 90% for drug detection dogs. Detection training exercises are documented and reviewed, so as to establish reliable informant detection dogs. Where dogs achieving the required minimum or higher reliability ratings are considered reliable enough to provide the legal basis for probable cause to conduct a thorough search under a valid search warrant. However in general, a given scent detecting dog may generalize to one or more variations of samples, when the dog is only trained on a single component; but, the average dog will not. Furthermore, when multiple variations of a mixed odor are tested, response rates are lower.

Another challenge was to assess the performance of dogs trained to reliably detect components of a mixture using a novel device that maintained separation of the components in distinct compartments while producing a merged odor presentation.

Odor delivery was accomplished using what can be loosely characterized as a custom-built, inverted "T"-shaped odor delivery apparatus (see FIG. 1A). The odor delivery apparatus (the apparatus for training dogs to detect complex hazardous substances 100) was constructed using commercially available 3 in (7.62 cm) diameter polyvinyl chloride (PVC) pipe fittings (JM EAGLE, Los Angeles, Calif., US). The two terminal end-caps (118A and 118B, respectively) of the inverted "T" shaped device allowed for the placement of PC-based materials of interest (one or both arms were used depending upon the experimental phase). Each terminal end-cap (such as end cap 118A and 118B) was attached to a 45° elbow (i.e., the PVC two way clean out adapter pipe 112, which was joined to the inverted "tee" joint fitting (i.e., the PVC two way clean out adapter pipe 112), which terminated with a drain fitting (PVC drain assembly 106, having a drain cover 104) perforated drain cover lid. Separate odor delivery systems were used for each odorant. Individual quantities of chemically pure (98 to >99%) potassium chlorate (PC, chemical formula $KClO_3$, CAROLINA BIOLOGICALS, Burlington, N.C., US), an undisclosed sub-component (provided by K2 Solutions Inc. under guidance of Naval Surface Warfare Center Indian Head), or combinations of the two were placed in an appropriate container inside one or both of the end caps (i.e., 118A and 118B, respectively) of the odor delivery apparatus. The mixtures and compositions mimicked materials used to produce HMEs in Afghanistan and thus the specific identities of the sub-components (gelling and fueling agents mixed with PC) were treated as proprietary information. Various types of packaging containers were used throughout training and experimental phases to contain the PC, components, and mixtures within the odor delivery apparatus including small plastic containers (TUPPERWARE CORPORATION, Orlando, Fla., US), glass containers (120A and 120B, respectively) with metal lids, plastic and cotton bags (similar to materials used by Gazit and Terkel, 2003). The use of several types of packaging materials is part of K2's odor training protocol intended to ensure that the dogs are discriminating the target odors and not the odor of the containers, and also mimics the use of various packaging materials associated with IEDs. Odor delivery through the apparatus was static and relied upon diffusion of the odorant through the apparatus. Depending upon the experimental phase, one or more odor delivery devices will be used in the test arena; however preferably, two or more odor delivery devices are used, because use of only one odor delivery device would prove to be easy for the dog, i.e., not forcing the dog to discriminate between targets.

Experimental testing was performed in a dedicated outdoor test arena at the K2 facility. This purpose-built floorless (earth and sand terrain) test arena had partial wooden walls and a complete wooden ceiling (HOME DEPOT, INC., Atlanta, Ga., US) and measured 7.3 m×9.8 m in size. The test arena's 1.2 meter-tall wooden walls segregated dog-trainer teams from the researchers and facilitated observation of all events.

This study was performed in three phases: (a) Phase 1—initial PC training and assessment; (b) Phase 2—generalization tests; and (c) Phase 3—evaluation of the novel training device (see Table 1). All experimental phase trials are videotaped and are performed in a sequence. Two trainers alternated handling the dogs on each trial in order to facilitate testing. Trainer-dog pairs were not kept consistent across sessions or trials, such that all dogs were handled by both trainers throughout the experiment.

Phase 1 (See Table 1)

Prior to beginning experimental test trials, all dogs (n=20) were trained by experienced K2 odor training staff to detect PC while acclimating to the odor delivery systems. Initial odor training with PC was performed at sites unassociated with the test arena used in subsequent experimental trials. Dogs were trained to perform an off-leash search and respond to approximately 450 grams (hereafter "g") of PC placed inside of the end cap 118A or 118B of an odor delivery system by sniffing the perforated tops (104) and "covering" (i.e. lying down in sternal recumbence) in proximity to the target odor delivery system; otherwise, it could be that the dogs are responding to just the end cap 118A or 118B and the perforated top of the first container 120A and/or at least the second container 120B. Upon demonstration of this behavior, dogs were rewarded by trainers through verbal reward and retrieval of a rubber KONG® toy (KONG COMPANY, Golden, Colo., US). One odor delivery system containing 450 g of PC inside one of the end caps (i.e., 118A or 118B) was used, with one or more (up to eight total, gradually increasing across training sessions) visually identical control odor delivery systems also present containing extraneous "distractor" odors (e.g., soil, metal, tea bags, packaging materials) or left empty ("blanks"). Blank trials were run occasionally in which no PC was present in any of the odor delivery devices. If a dog falsely responded to a device that did not contain the target, the trainer ignored the dog and allowed it to continue searching. Training sessions occurred Monday-Friday for 18 days and varied day-to-day in the number of search trials, pattern in which odor delivery systems were presented (e.g., circular or line formations), number of odor delivery devices presented, and order of dogs run. After initial PC training, a test was conducted in order to validate that the dogs could reliably detect and respond to the trained amount of PC before proceeding with the subsequent experimental phases. The training assessment session consisted of a total of ten trials: three test trials in which the target odor (PC) was present, and seven trials in which it was not. This and subsequent sessions were performed inside the dedicated test arena. Odor delivery devices were placed approximately 2 m apart in a circular formation inside the arena, and dogs were allowed to perform a search similar to that in the previous training phase. Trials 1 and 7 were blank trials, consisting of seven empty identical odor delivery containers. On Trials 2, 4, and 6, an odor delivery container, such as container 120A or container 120B, which held approximately 450 g of PC was added, placed in a random position each time. Distractor odors were placed in the seven other odor delivery systems. On Trials 3 and 5, only the seven distractor odor containers were present. Finally, Trials 8-10 consisted of control trials to check for the possibility of dogs responding based on the odor of the packaging materials used to contain the target odor during training instead of the PC odor. Three types of packaging materials were tested, one trial at a time: a cotton bag, a plastic container (TUPPERWARE CORPORATION, Orlando, Fla.), and glass container. On each of these trials, four odor delivery devices were present, one of which contained the packaging material and the other three were left empty.

System of Use

Multiple devices can be used simultaneously by a plurality of dog handlers to train a plurality of scent detecting dogs at a given time.

Also, multiple devices can be used for a plurality of different Home-Made Explosive compounds having different odors; such multiple devices having different compounds under test must each be marked (at the first opening 116A and the second opening 116B, of the devices) unobtrusively to ensure they are used only for the specific Home-Made Explosive component designated (as marked). Additional devices are used in the initial training process (imprinting) to ensure that a given dog is trained to respond to the Home-Made Explosive odor plume and not to the PVC pipe or other distraction odors, which are placed in proximity to the training device(s). Standard operant conditioning methods, including four-hole variable, odor wall or direct focus training are used in these exemplary embodiments. And, because the separated Home-Made Explosive components used in these exemplary embodiments are not explosive individually, they can be used safely in a variety of venues. However, the exemplary embodiments are not appropriate for use in training dogs for detection of Home-Made Explosives which undergo a chemical change during manufacturing such as triaceton triperoxide (TATP) or hexamethylene triperoxide diamine (HMTD).

Exemplary embodiments facilitate dogs being safely imprinted and routinely trained with high-threat Home-Made Explosive compounds. Dogs receive a foundational knowledge of a given type of Home-Made Explosive prior to operational use of the exemplary embodiments, which improves operational performance and allows stimulus generalization for Home-Made Explosive types to be built into the initial training program. Exemplary embodiments allow for rapid imprinting and training against emerging Home-Made Explosive threats without exposing explosive ordnance disposal personnel to the hazards associated with recovering training aid materials from actual Improvised Explosive Devices in theater. The flexibility exhibited by using the exemplary embodiments presented herein and the ability of dogs to be trained on many new odors, while retaining memory of earlier targets, offers the opportunity to have continual adaptation in odor training in order to remain relevant to current threats.

All dogs successively negotiate a first trial before the next trial type is set up. Prior to beginning a trial session, a randomized list is generated to designate the order in which the dogs are to be run through the testing exercise. The order is re-randomized after Trial 3. At the start of each trial, a given dog is walked to the testing arena on-leash by a K2 trainer and positioned in the designated start area. The leash is then removed from the dog, and a command to search is given to the dog. During the search, trainers remain at the arena entrance, avoiding eye contact with the dog and the trainer maintains a neutral body position in order to minimize unintentional cueing. On target odor trials (2, 4, and 6), the dog is rewarded with a KONG toy upon displaying a final response at the target location. An additional trainer outside of the testing arena and out of view of the dog tosses the reward into the arena the moment a correct response is exhibited. The dog is then removed from the test arena while the next dog is retrieved by a second trainer. Responses are recorded as either positive (dog gives a final response within an approximately 1 m range of the device) or a negative (dog searches target device but fails to give a final response). Upon a negative response, dogs are allowed to continue searching the remainder of the devices in the arena and then the dogs are removed with no reward. On non-target trials (1, 3, 5, 7-10), dogs are allowed to search the test arena and each device sufficiently before being called back by the trainer. Any responses to non-target devices are recorded as a false response. False responses are ignored by trainers, and the dogs are allowed to continue searching the remainder of the arena before being removed. In order to move on to the next experimental phase, a criterion is required of a positive final response on all three of the target odor trials and only dogs that meet this criteria continue to the subsequent experimental phase. False responses in this phase are recorded and analyzed, but not used as exclusionary criteria for moving to the next phase. In between subjects, the odor delivery devices are wiped down with a cloth and the test arena is lightly raked. After every fourth trial, all odor delivery devices are removed from the area and wiped down, and the entire test arena is raked. Data collectors observe from outside of the testing arena and independently record trial information and results.

Phase 2—Generalization Tests (See Table 1)

The goal of this phase is to evaluate whether dogs that reliably detected pure PC in Phase 1 would show a final response to a PC-based mixture (i.e. generalization of trained responses to novel odor combinations). Each mixture is produced on site by chemists associated with the US Naval Surface Warfare Center, Indian Head Division. Mixtures weigh approximately 200 g and are composed of 140-180 grams of PC and 20-60 grams of a sub-component. The amount of PC and the amount of the sub-component used in each mixture varies depending upon the chemical composition of the final explosive mixture tested. Because the identities of the sub-components used to formulate the final mixtures are to remain undisclosed, the PC-based mixtures used in Phase 2 and beyond are designated as Mixture 1, Mixture 2, Mixture 3, and Mixture 4 (see Table 2). Dogs are not previously exposed to the non-PC mixture component at any time.

Phase 2 is completed over 2 days, with one session each day consisting of six trials each. Testing is performed in sequence with all dogs. Eight odor delivery devices (such as the apparatus for training dogs to detect complex hazardous substances 100) are present in a circular formation on each trial. On Trials 1 and 6, all of the odor delivery systems are empty. On Trials 2 and 4, distractor odors are placed inside each odor delivery device. On Trials 3 and 5, one odor delivery device, randomly chosen, is removed and replaced with an odor delivery device containing Mixture 1 (Trial 3) or Mixture 2 (Trial 5). This sequence of trials is repeated on the second session the next day except Trial 3 uses Mixture 3, and Trial 5 uses Mixture 4. In this phase, trials are conducted in the same manner as the Phase 1 test trials (see 2.3.1), except the dogs are not rewarded for displaying a final response to the target container. Upon displaying a final response the dogs are called out of the test arena by the trainer who remains neutral. If a dog does not indicate a final response upon the first pass of the target device, the trial continues to allow the dog to search the remainder of the devices before being called back by the trainer. Responses are scored as a positive (dog shows immediate final response within 1 meter of target odor) or a negative (dog does not make a final response at the target odor). False responses (displaying a final response at a non-target device) are also recorded. The testing order of dogs is randomized for each mixture.

The first two trials of each session in this phase serve as exclusion criteria trials based on false responses. Dogs that exhibit a false response on both Trials 1 and 2 of either of the two sessions are removed from testing at this point. This is implemented in order to eliminate dogs displaying high rates of false responses which could potentially invalidate their future test results.

Phase 3—Evaluation of Novel Training Devices (See Table 1)

The purpose of this phase is to evaluate the effectiveness of the odor training devices of the odor delivery system as a method for dual odor presentation of binary mixture components. In this phase, the two components of each mixture (i.e. PC and a second component) are presented separately within the odor merging device (such as the apparatus for training dogs to detect complex hazardous substances 100). The PC is placed in one end cap (i.e., 118A or 118B) of the odor delivery device, while the other component is placed in the remaining end cap (i.e., 118A or 118B). The design of the odor delivery device ensures that the two components remain physically separated throughout the experiment; however, the air from the two components is combined by diffusion and presented as a merged odor to the dog. Ratios and amounts of the components remain consistent with the amounts used in the actual mixtures during the test phase (see 2.4). In this phase, dogs receive training with the binary components that correspond to any mixtures in which the dogs failed to alert to during Phase 2. Dogs are trained to respond to the odor delivery device containing the separated mixture components using methods described earlier (see Phase 1, section 2.3). Training occurs on Monday-Friday for 7 days. Criterion used to confirm that odor training is successful is met when the dog shows at least 10 consecutive unassisted positive responses to the odor delivery device containing the target odor.

Following training with the binary mixture components, all dogs that advanced from Phase 2 (in this case, n=16) are re-tested on fresh preparations of the four PC-based mixtures. Trials are conducted in the same manner as in Phase 2 (see 2.4). However in this phase, observers and trainers are blind to the trial conditions (i.e. odors present and mixture identity).

2.44 Variation of Odor Concentration

Next, dogs were presented with the four mixtures (see Table 2) containing novel concentrations of PC to determine the effect of varying the odor concentrations on the detection performance of scent detecting dogs. Dogs are tested with each of the four PC-based mixtures containing increased and decreased concentrations of PC. Trials are run in the same manner as the test sessions in Phases 2 and 3, except in one session the concentrations are increased to amounts ranging from about 300 up to about 700 g of PC, varying across mixtures, and in the other session concentrations are decreased to approximately a range of about 100 u p to about 150 grams of PC, varying across mixtures. Failure to respond to mixtures containing novel concentrations may indicate that the scent detecting dogs learn to respond to the specific trained amount of PC and may not recognize variations in measurement.

Finally, additional trials are run in which the non-PC sub-component is presented in the odor delivery device without the presence of any PC to determine if responding is under control of the non-PC component alone, which may have inadvertently developed during training; to test this, one trial is performed for each sub-component in which a fresh sample of the sub component is presented in a training device along with five blank training devices. Only dogs that received the PC-component odor merger training in Phase 3 are tested.

2.5 Data Analysis

Statistical analysis of categorical data (e.g., response vs. no response to test odor) are analyzed using a nominal logistic model with a likelihood ratio chi-square test (n=30 to 32 [for 15 or 16 dogs], df=1). All statistical analyses are performed using JMP Pro Version 9 (Cary, N.C., US). The results are considered statistically significant if $p \leq 0.05$.

3. Results 3.1 Initial PC Training and Assessment (Phase 1)

All dogs (n=20) showed a positive final response on all three test trials performed in Phase 1, satisfying the criterion to advance to the next phase of the study (Table 1). Twelve dogs displayed a false response on at least one of the 10 trials, but no more than three total false responses were committed by one dog. The remaining eight dogs did not display any false responses in the entire session. Two dogs alerted to devices containing packaging material during Trials 8-10 (note that these two dogs were later removed from the study for excessive false responses during the exclusion criterion trials of the subsequent phase). False responses were highest during distractor trials and on Trial 3.

TABLE 1

| Dog Name | Phase 1: PC Validation | | Phase 2: Generalization Test | | Phase 3: Training Evaluation | |
|---|---|---|---|---|---|---|
| | % Correct | % False | % | % False | % Correct | % False |
| Annie | 100 | 0 | 50 | 0 | 100 | 33 |
| Audi | 100 | 0 | 100 | 25 | 100 | 42 |
| Brutus | 100 | 10 | 0 | 17 | 100 | 0 |
| Charlie | 100 | 0 | 25 | 0 | 100 | 0 |
| Cricket | 100 | 0 | 0 | 0 | 100 | 0 |
| Drake | 100 | 20 | 0 | 17 | 100 | 8 |
| Dye | 100 | 0 | 50 | 18 | 75 | 0 |
| Frieda | 100 | 10 | — | — | — | — |
| Green | 100 | 10 | — | — | — | — |
| Harley | 100 | 10 | 100* | 17 | 100 | 8 |
| Heidi | 100 | 30 | — | — | — | — |
| Ike | 100 | 0 | 25 | 0 | 100 | 0 |
| Indy | 100 | 10 | 50 | 0 | 100 | 8 |
| Keppie | 100 | 30 | — | — | — | — |
| Kody | 100 | 30 | 100 | 17 | 100 | 0 |
| Moss | 100 | 0 | 75 | 0 | 100 | 0 |
| Pirate | 100 | 0 | 50 | 17 | 50 | 8 |
| Sadie | 100 | 10 | 75 | 17 | 100 | 0 |
| Sandy | 100 | 20 | 0 | 8 | 100 | 33 |
| Twiggy | 100 | 10 | 75 | 0 | 75 | 0 |

Note:
Dashes (—) indicate dogs eliminated due to false response.
An asterisk (*) denotes that this dog was absent on one session due to medical reasons and thus only received two of the four test trials.

3.12. Generalization Tests (Phase 2) (See Table 1)

Four dogs were removed from the study based on the false response exclusion criteria of Phase 2 (two consecutive false responses on Trials 1 and 2 of either session) and the remaining dogs (n=16) were tested on the four PC-based mixtures. One dog did not participate in the first session due to medical absence and therefore was not tested on Mixtures 1 and 2.

Percentage of positive responses to the four mixtures for all dogs combined ranged from 27%-69% (Table 2). Out of the 16 dogs, two showed a positive response to all four mixtures (100% response rate); three dogs showed a positive response to three of the four mixtures (75% response rate); four dogs had a 50% response rate, and four dogs failed to show a positive response to any of the PC-based mixtures responses (Table 1).

Individual false response rates over the 12 trials ranged from 0-25%, with seven of the 16 dogs displaying no false responses in the entire session (Table 1). False responses were highest during distractor trials and on Trial 2. Table 2 shows individual dogs" results for each of the PC-based mixture test trials for the Phase 2 generalization test ("pre").

3.2 Evaluation of Novel Training Device (Phase 3)

Next, dogs received additional training corresponding to individual performance during each of the Phase 2 generalization tests for 7 days until a criterion of ten consecutive positive responses per odor was achieved. All eligible dogs (n=16) were then re-tested on the four PC based mixtures. Total percent correct for each mixture ranged from 81-100% of dogs tested. Positive responses to the PC-based mixtures were significantly higher than responses to the PC-based mixtures in Phase 2; significant differences were seen with Mixture 1 ($\chi^2$=22.03, p<0.0001, n=30, df=1), Mixture 2 ($\chi^2$=5.18, p=0.0229, n=30, df=1), Mixture 3 ($\chi^2$=12.53, p=0.0004, n=32, df=1), and Mixture 4 ($\chi^2$=7.86, p<0.0050, n=32, df=1). Thirteen of the 16 dogs showed a positive response to all four mixtures (100% response rate); two dogs showed a positive response to three of the four mixtures (75% response rate), and one dog performed with a 50% response rate (Table 1). Individual dogs" responses to each of the four mixtures, pre and post Phase 3 odor merger device training, are reported in Table 2.

In Phase 3, individual false response rates by dogs ranged from 0-42% over the 12 trials, with nine of the 16 dogs showing no false responses in the entire session (Table 2). Patterns of false responding were similar to Phase 2 in which the highest were seen during distractor trials and on Trial 2.

3.3 Variation of Odor Concentrations

All dogs tested demonstrated a positive response on each of the eight trials (100% response rate) in which varying concentrations were presented (Table 2). Seven of the 16 dogs showed a positive response to at least one of the four non-PC mixture components when presented alone (Table 2). Total percentage of positive responses across the four sub-components ranged from 0-36%.

Training with the separated components contained within the odor delivery system significantly improved the positive detection rate for PC-based explosives. After training with the separated components in the odor delivery system, overall positive response rates to four PC based explosive mixtures increased from 27-69% to 81-100%. Individual dog performance also became more uniform. During the first generalization test (Phase 2), only two of the 16 dogs responded with 100% accuracy. Of the remaining dogs that scored below 100% on the first test and proceeded to receive further training in Phase 3, accuracy increased upon re-test of the mixtures for 12 of the 14 dogs.

the two components did not actually need to be mixed together during training in order to produce detection of the combined odors.

Training and testing of the dogs were constrained by certain standard operating procedures used by the K2 facility that were beyond the investigator's control. First, for safety reasons, trainers were not blinded to the location of the target device, presenting the possibility of unintentional cueing by gaze, posture, and proximity to the dog or odor (Lit et al., 2011). However, dogs in the current study were always worked off-leash and handlers remained at a distance while avoiding eye contact and maintaining neutral posture. The observers and data collectors remained outside of the testing arena, separated by the wooden walls, obstructing the dog's view of the people from the chest down. Throughout the study, dogs did not appear to attend to any of the people outside of the testing area as they were largely out of view. This is likely due to training practices at K2 in which dogs are trained to attend exclusively to the target objects and odors, while ignoring extraneous sources of distraction including other people, animals, and sounds. Further, the low response rates seen in Phase 2 generalization tests trials, despite the observer's and trainer's knowledge of the target location, suggests that the dogs did not use human directed cues to locate the target. Additionally, the majority of false responses occurred on trials in which observers knew that no target odor was present. Although, it cannot be ruled out that some dogs used unintentional trainer or observer cueing; however, such cueing did not play a significant role in the dog's performance; future studies will minimize such possibilities of trainer or observer cueing.

False responses observed in several of the dogs throughout testing may have weakened the interpretation of the positive responses; however, overall false response rates throughout the study were relatively low. In Phase 1, false responses were

TABLE 2

| | Mixture 1 | | | | | Mixture 2 | | | | | Mixture 3 | | | | | Mixture 4 | | | | |
|---|---|---|---|---|---|---|---|---|---|---|---|---|---|---|---|---|---|---|---|---|
| Dog | Pre | Post | 0-PC | +PC | −PC | Pre | Post | 0-PC | +PC | −PC | Pre | Post | 0-PC | +PC | −PC | Pre | Post | 0-PC | +PC | −PC |
| Annie | 0 | 1 | 1 | 1 | 1 | 1 | 1 | — | — | — | 0 | 1 | 1 | 1 | 1 | 1 | 1 | — | — | — |
| Audi | 1 | 1 | 1 | 1 | 1 | 1 | 1 | 0 | 1 | 1 | 1 | 1 | 0 | 1 | 1 | 1 | 1 | 0 | 1 | 1 |
| Brutus | 0 | 1 | 0 | 1 | 1 | 0 | 1 | 0 | 1 | 1 | 0 | 1 | 0 | 1 | 1 | 0 | 1 | 0 | 1 | 1 |
| Charlie | 0 | 1 | 0 | 1 | 1 | 1 | 1 | — | 1 | 1 | 0 | 1 | 0 | 1 | 1 | 0 | 1 | 0 | 1 | 1 |
| Cricket | 0 | 1 | 0 | 1 | 1 | 0 | 1 | 0 | 1 | 1 | 0 | 1 | 0 | 1 | 1 | 0 | 1 | 0 | 1 | 1 |
| Drake | 0 | 1 | 0 | 1 | 1 | 0 | 1 | 0 | 1 | 1 | 0 | 1 | 0 | 1 | 1 | 0 | 1 | 0 | 1 | 1 |
| Dye | 0 | 1 | 0 | 1 | 1 | 0 | 0 | 0 | 1 | 1 | 1 | 1 | — | — | — | 1 | 1 | — | — | — |
| Harley | — — | 1 | 0 | 1 | 1 | — — | 1 | 0 | 1 | 1 | 1 | 1 | — | — | — | 1 | 1 | — | — | — |
| Ike | 0 | 1 | 0 | 1 | 1 | 0 | 1 | 0 | 1 | 1 | 0 | 1 | 0 | 1 | 1 | 1 | 1 | — | — | — |
| Indy | 0 | 1 | 1 | 1 | 1 | 0 | 1 | 0 | 1 | 1 | 1 | 1 | — | — | — | 1 | 1 | — | — | — |
| Kody | 1 | 1 | 1 | 1 | 1 | 1 | 1 | 0 | 1 | 1 | 1 | 1 | 0 | 1 | 1 | 1 | 1 | 0 | 1 | 1 |
| Moss | 1 | 1 | — | — | — | 1 | 1 | — | — | — | 0 | 1 | 1 | 1 | 1 | 1 | 1 | — | — | — |
| Pirate | 0 | 1 | 0 | 1 | 1 | 0 | 0 | 0 | 1 | 1 | 1 | 0 | — | — | — | 1 | 1 | — | — | — |
| Sadie | 1 | 1 | — | — | — | 1 | 1 | — | — | — | 0 | 1 | 1 | 1 | 1 | 1 | 1 | — | — | — |
| Sandy | 0 | 1 | 1 | 1 | 1 | 0 | 1 | 0 | 1 | 1 | 0 | 1 | 1 | 1 | 1 | 0 | 1 | 1 | 1 | 1 |
| Twiggy | 0 | 1 | 0 | 1 | 1 | 0 | 0 | 0 | 1 | 1 | 0 | 1 | 0 | 1 | 1 | 1 | 1 | — | — | — |

Note:
Single dashes (—) indicate dogs exempt from a trial.
Double dashes (— —) indicate absence for medical reasons.

Exclusively training dogs with a standard amount of a single target substance was not sufficient to produce reliable generalization to mixtures containing that substance, and that in order to obtain high levels of positive detection of the target binary mixtures, dogs needed to be trained with both of the components. However, results from the Phase 3 trials, in which dogs were trained to the segregated components and subsequently tested on the explosive mixture, indicated that recorded but were not used as exclusionary criteria. In this phase, dogs simply needed to demonstrate proficiency in reliably detecting PC. False responses at this point were likely due to the novelty of the training paradigm. Dogs were still early in their training and habituating to searching the devices in the test arena. At the start of Phase 2, four dogs were excluded based on displaying an excessive number of false responses (defined as two or more in Trials 1 and 2 of either session) in order to minimize potential confounding of test data. Of the 16 dogs that advanced, five dogs never exhibited a false response in the remainder of the study. The remainder of the dogs made an average of 18% false responses in Phases 2 and 3 combined.

While the exemplary embodiments have been particularly shown and described with reference to preferred embodiments thereof, it will be understood, by those skilled in the art that the preferred embodiments have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claim and/or claims and their equivalents. Furthermore, references cited herein are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. The foregoing description of the specific embodiments will so fully reveal the general nature of the invention so that others can, by applying knowledge and skill within the art, readily modify and/or adapt for various applications such specific embodiments, without undue experimentation, and without departing from the general concept of the exemplary embodiments. Therefore, such adaptations and modifications are intended to be within the meaning and range of equivalents of the disclosed embodiments, based on the teaching and guidance presented herein.

What is claimed is:

1. A training apparatus used to train scent dogs to detect complex hazardous substances from an odor mixture developed from an at least two separated material components having at least two separated odors respectively, the apparatus comprising:
   a first container and an at least second container, having a plurality of holes, in a top side of the first container and the at least second container, providing ventilation;
   a first elbow shaped pipe and an at least second elbow shaped pipe, having a first compartment and an at least second compartment, wherein the first container and the at least second container reside in the first compartment and the at least second compartment, respectively;
   a first end cap and an at least second end cap positioned in the first and at least second compartments to seal the first container and the at least second container securely in the first compartment and at least second compartment, respectively;
   a two way clean out adapter pipe having a third opening, a fourth opening and a fifth opening configured as coupling connections with the first elbow pipe, the at least second elbow pipe and the two way clean out adapter pipe, wherein separated odors from separated material components situated in separated containers mix by diffusion and provide an odor mixture developed from separated material components presented to a scent detecting dog;
   a connector pipe connected to the fifth opening on top of the two way clean out adapter pipe; and
   a drain assembly, having a drain cover, wherein the drain cover includes a plurality of holes and is affixed on top of the drain assembly; wherein the drain assembly is connected on top of the reducer pipe at a sixth opening formed at the bottom of the drain assembly, allowing odors to rise up and out of the training apparatus, wherein dogs are trained with an at least two explosive elements; and wherein the at least two explosive elements are separated in separate containers.

2. The training apparatus according to claim 1, wherein the first elbow pipe and the at least second elbow pipe are positioned in a configuration of legs, wherein the configuration of legs is selected from a group of configurations of legs consisting of the first elbow pipe and the at least second elbow pipe rotated about an axis of the two way clean out adapter pipe at the third opening and at the fourth opening respectively, until the first elbow pipe and the at least second elbow pipe are positioned vertically configured as legs, upon which the two way clean out adapter pipe stands and consisting of the first elbow pipe and the at least second elbow pipe rotated about the axis of the two way clean out adapter pipe at the third opening and at the fourth opening respectively, until the first elbow pipe and the at least second elbow pipe are positioned horizontally configured as legs upon which the two way clean out adapter pipe rests, and wherein the first end cap and the at least second end cap positioned in the first and second compartments are facing in opposite directions.

3. The training apparatus according to claim 1, wherein the at least two explosive elements include ammonium nitrate and potassium chlorate, which can interact with a plurality of fuel oils and powdered aluminum compounds to form a homemade improvised explosive device.

4. The training apparatus according to claim 1, wherein the odors which rise up and out of the training apparatus include psuedoscents, and odors from inert substances and odors from individual components of normally mixed/combined compounds of explosives, and military grade explosives.

5. The training apparatus according to claim 1, wherein the training apparatus is composed of pipe and tubing components selected from a group of pipe and tubing components consisting of polyvinyl chloride (PVC) plastic pipe and fittings, and metal pipe and fittings, rubber pipe and fittings, glass pipe and fittings and ceramic pipe and fittings having a range in diameter of from about 2 inches up to about 4 inches.

6. The training apparatus according to claim 1, wherein the at least two separated material components are in one of static proof bags and filter paper bindles to preclude loss of the at least two separated material components' particulate matter.

7. A method of training scent dogs to detect complex hazardous substances from an odor mixture developed from at least two separated material components, housed in a training apparatus, containing at least two separated odors respectively, the method comprising:
   inserting, by a human trainer, an at least two different samples of explosive material components into a first container and a second separate container; thereby eliminating manufacture of explosives;
   placing the first container and the second separate container into a first opening and a second opening of the training apparatus, in a manner allowing odor vapors from the first container and the second separate container to escape from holes in said first container and said second separate container, wherein such odor vapors rise through a process of diffusion into a two way clean out assembly within the training apparatus, wherein the odor vapors from the first container and the second separate container mix forming an odor mixture, which further diffuses up through a drain assembly, wherein the drain assembly has holes allowing the odor mixture to diffuse into air being in close proximity to the drain assembly;

presenting, by the human trainer, the odor mixture diffusing out of the drain assembly, to a scent detecting dog, wherein the odor mixture spreading by the process of diffusion from a high concentration of odors in the first container and the second separate container to a low concentration of odors in training apparatus include psuedoscents, and odors from inert substances and odors from individual components of normally mixed compounds of explosives, and military grade explosives and improvised explosive device compounds, and wherein the process of diffusion from the high concentration of odors to the low concentration of odors in air in close proximity to the drain assembly cause the odor mixture to be confined to air in close proximity to drain assembly; and training the scent detecting dog, by the human trainer to perform a conditional response to the odor mixture.

8. The method according to claim 7, wherein the training apparatus is composed of pipe and tubing selected from a group of pipe and tubing consisting of polyvinyl chloride (PVC) plastic pipe and fittings, and metal pipe and fittings, rubber pipe and fittings, glass pipe and fittings and ceramic pipe and fittings having a range in diameter of from about 2 inches up to about 4 inches.

9. The method according to claim 7, wherein the at least two different samples of explosive elements including a fertilizer and potassium chlorate, which interact with a plurality of sub components, including fuel oils and powdered aluminum compounds, are tested in both component mixture trials and in component non-mixture trials, wherein an at least more than one training apparatus is used to test the at least two different samples of explosive elements and the plurality of sub components separately, and wherein the at least more than one training apparatus is spaced at least 2 meters apart from any other of the at least more than one training apparatus.

10. The method according to claim 9, wherein, by weight in component mixture trials and in component non-mixture trials, a first range of values of the at least two different samples of explosive elements is from about 140 grams up to about 700 grams of PC, wherein, by weight, a second range values of the plurality of sub components is from about 20 grams to about 60 grams of any one of the sub components, wherein the at least more than one training apparatus is used to test the at least two different samples of explosive elements and the plurality of sub components separately, and wherein the at least more than one training apparatus is spaced at least 2 meters apart from any other of the at least more than one training apparatus.

11. A system of training scent dogs to detect complex hazardous substances from an odor mixture developed from at least two separated material components, housed in a group of multiple odor delivery training devices, containing at least two different explosive compounds having an at least two separate odors, respectively including odors from home-made explosives, as well as military grade explosives, wherein the group of multiple odor delivery training devices is used to train a given scent dog, the system comprising:

a plurality of odor delivery training devices, wherein each odor delivery training device of the plurality of odor delivery training devices includes:

a first container and an at least second container having a plurality of holes, in a top side of the first container and the at least second container, providing ventilation;

a first elbow shaped pipe and an at least second elbow shaped pipe, having a first compartment and an at least second compartment, wherein the first container and the at least second container reside in the first compartment and the at least second compartment, respectively;

a first end cap and an at least second end cap positioned in the first and at least second compartments to seal the first container and the at least second container securely in the first compartment and at least second compartment, respectively;

a two way clean out adapter pipe having a third opening, a fourth opening and a fifth opening configured as coupling connections with the first elbow pipe, the at least second elbow pipe and the two way clean out adapter pipe, wherein separated odors from separated material components, situated in separated containers, mixing by a process of diffusion, provide the odor mixture developed from separated material components, presented to a scent detecting dog, wherein the first elbow pipe and the at least second elbow pipe are positioned in a configuration of legs, wherein the configuration of legs is selected from a group of configurations of legs consisting of the first elbow pipe and the at least second elbow pipe rotated about an axis of the two way clean out adapter pipe at the third opening and at the fourth opening respectively, until the first elbow pipe and the at least second elbow pipe are positioned as vertical legs, upon which the two way clean out adapter pipe stands and consisting of the first elbow pipe and the at least second elbow pipe rotated about the axis of the two way clean out adapter pipe at the third opening and at the fourth opening respectively, until the first elbow pipe and the at least second elbow pipe are positioned as horizontal legs upon which the two way clean out adapter pipe rests, and wherein the first end cap and the at least second end cap positioned in the first and second compartments are facing in opposite directions;

a connector pipe connected to the fifth opening on top of the two way clean out adapter pipe; and a drain assembly, having a drain cover, wherein the drain cover includes a plurality of holes and is affixed on top of the drain assembly; and wherein the drain assembly is connected on top of the connector pipe at a sixth opening formed at the bottom of the drain assembly, allowing odors to rise up and out of the odor delivery training device, wherein dogs are trained with an at least two explosive elements;

wherein the at least two explosive elements are separated in separate containers, and wherein the odor mixture spreading by the process of diffusion from a high concentration of odors in the first container and the second separate container to a low concentration of odors in air in close proximity to the drain assembly cause the odor mixture to be confined to air in close proximity to the drain assembly.

12. The system according to claim 11, wherein the at least two separate odors include psuedoscents, inert substances and individual components of a normally mixed compound of home-made explosives, as well as military grade explosives.

13. The system according to claim 11, wherein each odor delivery training device of the plurality of odor delivery training devices is marked, as containing a specific component, wherein each specific component can be one of an available bulk explosive component including ammonium nitrate (AN) and potassium chlorate (PC) and any number of a booster including fuel oil, powdered aluminum compounds or other household or industrial substances, and wherein production, storage and use of such components with actual explosive substances combined is hazardous.

14. The system according to claim 11, wherein each odor delivery training device of the plurality of odor delivery training devices is clearly marked, as containing two or more of a specific component, wherein each of the two or more specific component(s) can be one of an available bulk explosive component including ammonium nitrate (AN) and potassium chlorate (PC) and any number of a booster including fuel oil and powdered aluminum compounds, wherein production, storage and use of such components with actual explosive substances combined is hazardous, and wherein mixtures of such components mimic materials used to produce homemade explosives.

15. The system according to claim 11, wherein the first container and the at least second container include metal containers, rubber containers, plastic containers, ceramics containers and glass containers, having a diameter ranging from about 2 inches up to about 3 inches.

16. The system according to claim 11, wherein before beginning test trials, all dogs are trained to detect an HME.

17. The system according to claim 11, wherein all dogs are trained to perform an off-leash search, by sniffing the drain cover having the plurality of holes, on top of the drain assembly and "covering" in proximity to a target odor in response to approximately 450 g of PC, placed inside one of the first container and the at least second container residing in one or more of the first end cap and the at least second end cap, and wherein the first end cap and the at least second end cap are positioned in the first and at least second compartments to seal the first container and the at least second container securely in the first compartment and at least second compartment, respectively of the odor delivery training device.

18. The system according to claim 11, wherein blank trials are run, wherein the first container and the at least second container are selected from a group of containers placed randomly consisting of empty containers and containers having one or more of extraneous "distractor" odors, and wherein odor delivery training devices are placed approximately 2 m apart in a circular formation inside a test arena.

19. The system according to claim 18, wherein dog scent test results are reliable, and repeatable, wherein an increased number of dogs can be tested on a single odor delivery training device, and wherein the test arena is free of odor contamination, because each odor delivery training device confines low concentrations odor mixtures to air in close proximity to the drain assembly.

20. The system according to claim 19, wherein a plurality of odor delivery training devices are used simultaneously by a plurality of dog handlers to train a plurality of scent detecting dogs at a given time.

* * * * *